United States Patent [19]
Olah et al.

[11] Patent Number: 5,876,198
[45] Date of Patent: Mar. 2, 1999

[54] SEQUENTIAL STEP BELT FURNACE WITH INDIVIDUAL CONCENTRIC HEATING ELEMENTS

[75] Inventors: William Wayne Olah, Wappingers Falls; Thomas Paul White, Wanakena, both of N.Y.

[73] Assignee: International Business Machines Corporation, Armonk, N.Y.

[21] Appl. No.: 462,341

[22] Filed: Jun. 5, 1995

Related U.S. Application Data

[62] Division of Ser. No. 920,948, Jul. 28, 1992.

[51] Int. Cl.⁶ .................................................. F27D 15/02
[52] U.S. Cl. .......................... 432/59; 432/72; 219/464; 219/388
[58] Field of Search ................... 432/59, 8, 143, 432/146, 147, 153, 5, 6, 128

[56] References Cited

U.S. PATENT DOCUMENTS

| | | | |
|---|---|---|---|
| 3,208,740 | 9/1965 | Nesbitt et al. | 432/147 |
| 3,843,857 | 10/1974 | Cunningham | 219/624 |
| 3,982,887 | 9/1976 | Kendziora et al. | 432/128 |
| 4,276,603 | 6/1981 | Beck et al. | 364/477 |
| 4,471,214 | 9/1984 | Gossler et al. | 219/464 |
| 4,508,961 | 4/1985 | McWilliams | 219/464 |
| 4,551,093 | 11/1985 | Sisbarro | 432/146 |
| 4,554,437 | 11/1985 | Wagner et al. | 219/388 |
| 4,610,886 | 9/1986 | Buller | 426/233 |
| 4,711,989 | 12/1987 | Yu | 219/390 |
| 4,784,069 | 11/1988 | Stark | 432/72 |
| 4,789,332 | 12/1988 | Ramsey et al. | 432/59 |
| 4,790,749 | 12/1988 | Mauro | 432/59 |
| 4,857,689 | 8/1989 | Lee | 432/128 |
| 4,886,954 | 12/1989 | Yu et al. | 219/390 |
| 4,915,624 | 4/1990 | Mittlestadt | 432/128 |
| 4,932,864 | 6/1990 | Miyabe | 432/128 |
| 4,950,870 | 8/1990 | Mitsuhashi et al. | 219/390 |
| 4,966,547 | 10/1990 | Okuyama et al. | 432/9 |
| 4,982,347 | 1/1991 | Rackerby et al. | 364/557 |
| 5,172,849 | 12/1992 | Barten et al. | 432/128 |
| 5,421,723 | 6/1995 | Katz et al. | 432/59 |
| 5,443,383 | 8/1995 | Kuehn | 432/128 |

Primary Examiner—Tony M. Argenbright
Attorney, Agent, or Firm—Aziz M. Ahsan

[57] ABSTRACT

This invention relates generally to a belt type furnace. More specifically, this invention relates to a belt type furnace that sequentially stops the belt at the vicinity of at least one heater, and where the heater comprises at least two heating elements.

21 Claims, 2 Drawing Sheets

- COMPUTER
- COOLING UNIT
- VARIABLE SPEED MOTOR
- TEMPERATURE CONTROLLER
- HEATING MEDIA PROPORTIONING DEVICE

SEQUENTIAL STEP BELT FURNACE WITH INDIVIDUAL CONCENTRIC HEATING ELEMENTS

The application is a division, of application Ser. No. 07/920,948, filed Jul. 28, 1992.

FIELD OF THE INVENTION

This invention relates generally to a belt type furnace. More specifically, this invention relates to a belt type furnace that sequentially stops the belt at the vicinity of at least one heater, and where the heater comprises at least two heating elements.

BACKGROUND OF THE INVENTION

For many years the electronics industry has used belt type furnaces for high volume heating applications. For an application, such as chip join, the operation is characterized by loading many parts on the belt, followed by continuous movement of the belt through the furnace's heating areas. It is also very important that the furnace provides a uniform temperature across the belt so that each individual part reaches the same temperature during processing. During a typical high volume heating applications intra-part gradients and short dwell times never becomes a problem, because the parts are small and are easily heated. For these applications the total heating system has evolved to a point where it is very reliable and reasonably priced.

U.S. Pat. No. 4,554,437 (Wagner et al.) discloses a continuous speed belt type tunnel oven which allows a user to select different top and bottom temperatures within each of the plural cooking zones.

U.S. Pat. No. 4,886,954 (Yu et al.) discloses a hot wall diffusion furnace and a method for operating the furnace. Yu et al. disclose that the heating elements in the upper section of the furnace be connected to one circuit, and the heating elements of the lower section of the furnace be connected to a second circuit, and that each circuit be controlled in response to the temperature in that section, so that uniform temperature can be obtained in the processing chamber.

U. S. Pat. No. 4,950,870 (Mitsuhashi et al.) discloses a heat-treating apparatus having at least three heaters and the power to these heaters can be supplied from independent power sources so that the heating temperatures of the individual heaters can be freely adjusted. Additionally, the multiple heaters in the vertical furnace attain a uniform heat distribution throughout the heating zone.

U.S. Pat. No. 4,966,547 (Okuyama et al.) discloses a heat treatment method using a zoned tunnel furnace. The furnace has roller conveyer and each of the zones in the furnace walls are provided with electric resistance heating wires. The heaters in each zone are under programmed control, independent of the heaters in the other zones. Similarly, the roller conveyer in each zone can be driven independent of the roller conveyer in the other zones by programmable controllers.

U. S. Pat. No. 4,982,347 (Rackerby et al.) discloses a process and apparatus for producing temperature profiles in a workpiece as it passes through a belt furnace. Each of the heaters has their own separate thermostats, which enables the temperature of each heater to be separately set. Thus a workpiece can be subjected to a temperature profile which varies from heater to heater along the passageway.

The parts or products using conventional belt type furnaces have changed over time. Some of the parts have been getting larger, and it has become increasingly difficult to do the same type of processing on the larger parts, as done by the furnaces known in the art. Because of the thermal mass or thermal weight some of the larger parts resist being heated quickly. Another factor is that newer and different materials are being used to make these parts and these newer materials require a different heating regimes. These issues are further compounded by the fact that now closer temperature control and lower intra-part gradients are being required by the electronics industry, and this has made the conventional belt furnace only marginally acceptable.

The manufacturers of conventional belt type furnaces have made quite a few upgrades to their furnaces in response to the industrial needs. Some upgrades include providing better and more efficient gas flows. Others have provided improved zone separation. And, still others are providing better cooling in the cool down section. Most of these changes are required because the parts or products are less tolerant to thermal process irregularities and the resultant mechanical stress.

For the larger parts it was observed that when these large parts were run in conventional belt furnaces they heat around the periphery faster than in the center. It was noticed that this temperature gradient was as large as 50° C. or larger. Some of the conventional belt type furnace manufacturers have responded to this problem by providing left, right, as well as center, trim or adjustment control in their furnaces to try to solve this problem. This provides heat to the left, right and center of the part, but provides no heat adjustment to the leading or trailing edge of the part. And, nothing has been done to control front to back and intra-part gradients of the part or substrate.

For the above-mentioned reasons, processes such as chip join and pin braze on larger products cannot always be processed within specification using the belt type conventional furnaces. And, those parts that are processed, are processed at the full tolerance of the specification.

For example, the chip join process is characterized by two main parameters. The chip join process, is a process where an I. C. chip is joined to a substrate or carrier, typically using a plurality of solder balls. First, the part, such as a chip and the substrate, must go from the melting point of the alloy (Mp), i.e., the Mp of the solder balls, to a greater temperature (e.g. over 30° C.) and then back to Mp. Secondly, this raising and lowering of the temperature for the chip join process must be done in minutes. This has not been a problem for most belt furnaces, as long as the part or product or carrier is in the 50 mm by 50 mm size range. Products or substrates in the 100 mm by 100 mm size range begin to present a problem, due to their large thermal mass, making it very difficult to heat to the desired temperature and then cool it to its original temperature in minutes. Furthermore, rapid heating of these parts or carriers introduces large temperature gradients. These gradients as discussed elsewhere are as large as 50° C. or larger.

Another problem faced in the use of conventional belt furnaces is that when flux or similar contaminants are used in a conventional belt furnace they get deposited on the walls of the furnace creating a contamination problem. The reason for this problem is the fact that in the conventional belt furnaces the process gases enter at the end of the last heated zone and they flow toward the front or load end of the furnace where it normally exits. Flux and similar contaminants are used in many processes, such as a soldering process. Similarly, there are other solvents which evaporate from the surface of the part, as the part is heated, and they enter the flow of the gases in the furnace, flowing from the hotter end or area to a colder area. This causes the vaporized solvents and similar other material to condense on cooler furnace areas and this collects as contamination. One of the main reason to have the gas flow in this direction in a conventional belt furnace is to use the hot gas to heat small parts in the front or load end of the furnace by convection. On small parts this scheme provides more uniform heating. This contamination of the furnace wall problem does not exists in the inventive furnace.

The belt furnace of this invention overcomes the above-mentioned and other shortcomings of the conventional belt type furnaces.

BRIEF SUMMARY OF THE INVENTION

In one aspect the invention comprises an apparatus for heating at least one structure, comprising;
 a) at least one means for securely transporting said at least one structure,
 b) at least one heating zone in said apparatus, wherein said heating zone further comprises at least one heater with at least two individual heating elements,
 c) at least one means for moving and holding said at least one means for securely transporting in the area of said at least one heating zone and holding it there while said at least one structure is being heated by said at least two heating elements.

In another aspect the invention comprises an apparatus for heating at least one structure, comprising;
 a) at least one belt for securely transporting said at least one structure,
 b) at least one heating zone in said apparatus, wherein said heating zone further comprises at least one heater with at least two individual heating elements,
 c) at least one sequential motor for moving and holding said at least one belt in the area of said at least one heating zone and holding it there while said at least one structure is being heated to the desired temperature by said at least two heating elements.

In still another aspect the invention comprises a process for heating a structure comprising:
 a) moving and holding said structure in the vicinity of a heating zone,
 b) heating said structure in said heating zone, wherein said heating zone comprises at least one heater having at least two individual heating elements,
 c) said heating zone heats said structure in such a manner that said substrate has a minimum of thermal gradient, and
 d) moving said part to the next zone after the desired temperature has been reached.

PURPOSES OF THE INVENTION

One purpose of this invention is to provide a belt type furnace to process substrate laminates with a minimum intra-part temperature gradient.

Another purpose of the invention is to provide a sequential drive belt system that transports the parts and stops them under multiple, individually controlled concentric heating elements.

Still another purpose of this invention is to allow the parts to be heated to a specified amount in each successive zone until the desired temperature is reached in the last zone.

Yet another purpose of this invention is the time the belt dwells in each zone and the transit time be adjustable.

Yet another purpose of this invention is to provide means for the heating elements to provide non-uniform heating to the part.

Yet another purpose of this invention is to provide means for the heating elements to provide uniform heating to the part.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention may be best understood by the description which follows, taken in conjunction with the accompanying drawings in which:

DETAILED DESCRIPTION OF THE INVENTION

This invention primarily relates to a multi-zone belt furnace that utilizes a sequential drive belt system and a plurality of heating elements in each zone.

Figure 1:
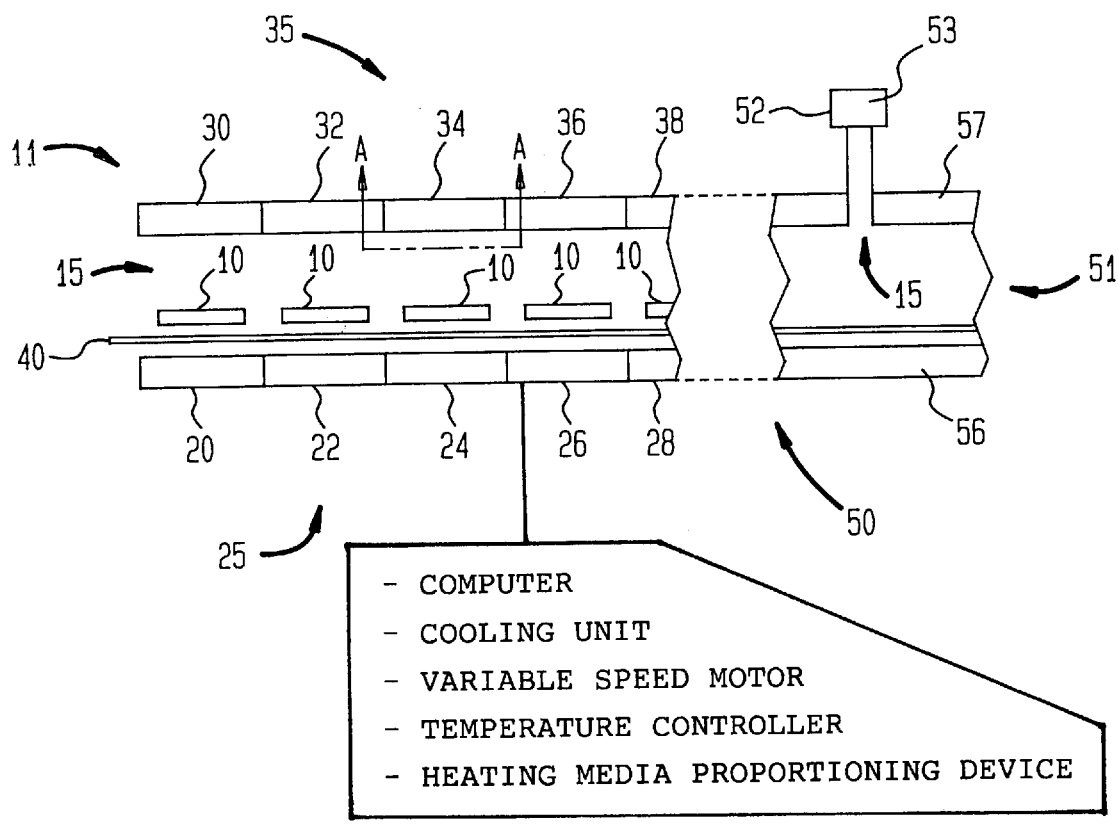
FIG. 1, is a schematic cross-sectional view of a preferred embodiment of a furnace of this invention.

Referring to FIG. 1, disclosed according to the invention is a sequential belt type furnace 50, having at least one heating zone. The heating zone could be at least one lower heating zone 25, and/or at least one upper heating zone 35, or a sidewall type of a heating zone (not shown). There are means (not shown) that move at least one belt 40, through the furnace heating area in a sequential manner. One or more parts or products 10, such as an I. C. chip or substrate, that need a heat treatment are placed on the upper surface of the belt 40. The lower heating zone 25, typically has one or more individual lower heaters, such as individual lower heaters 20, 22, 24, 26 and 28. The lower heating zone 25, could also extend to an individual lower heater 56. Similarly, the upper heating zone 35, typically has one or more individual upper heaters, such as individual upper heaters 30, 32, 34, 36 and 38. The upper heating zone 35, could also extend to an individual upper heater 57. Each of the individual heaters, whether upper, lower or side heaters, must have preferably at least two concentric heating elements. Each zone temperature could be determined by a single thermal sensor, such as a single thermocouple (not shown) in each heating element, or with the use of a single zone thermal sensor. Of course one could use a proportioning device to further adjust the individual zone elements. This would allow the power to be proportionately distributed to each heating element in predetermined amounts. The belt 40, sequentially moves the parts or products 10, through the various heating zones in a manner such that at least a portion of the part or product 10, is stationary or stopped in the vicinity of an individual heater.

The furnace 50, typically has a gas 15, that flows along the path of the parts. It is preferable that the furnace 50, has an afterburner 53, with an igniting media 52, to burn off the gas 15. The igniting media 52, is typically selected from a group comprising one or more flammable gases, such as, hydrogen, propane, natural gas, etc.

This gas 15, can be used to avoid contamination of the walls and other surfaces of the furnace 50, by introducing the gas 15, at the load end 11, of the furnace 50, and allowing it to move towards the last heating zone 51. The gas 15, can be directed to go into an afterburner 53, which has an igniting media 52, to consume the gas 15, and the other contaminants that may have flowed with it inside the afterburner 53.

Figure 2:
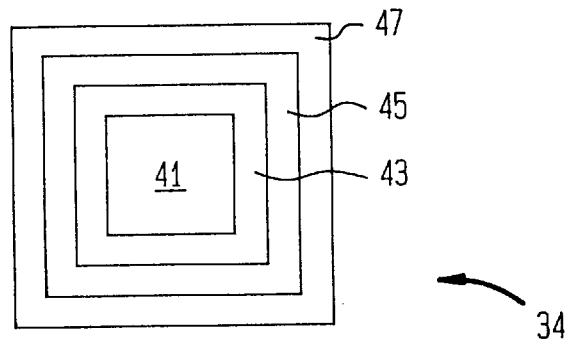
FIG. 2, is a schematic view showing section A—A, from FIG. 1.

FIG. 2, shows a schematic view taken along section A—A, in FIG. 1, showing a typical individual heater made according to the teaching of this invention. The individual upper heater 34, shown as an example, has heating elements 41, 43, 45 and 47, which are preferably concentric. A person skilled in the art could of course put more or less number of individual heating elements. These individual heating elements 41, 43, 45 and 47, could have similar heat output or different thermal output profile. This would of course depend on the particular application. The only requirement for the heating elements 41, 43, 45 and 47, is that they provide a heating profile that heats the part or product, so that the intra-part thermal gradient is minimized.

It has been found that the belt furnace 50, described in this invention processes large parts, such as 100 mm by 100 mm or larger parts, through the whole heating cycle, i.e., through the initial or first heating zone to the final quench or "cooling" zone, with less than a 10° C. temperature variation across the whole part.

The problem of high thermal gradients occurring when the part 10, transits from the last heating zone to the first cooling zone, has been greatly reduced by the adoption of the furnace 50, of this invention. This is due to the fact that the part 10, can be similarly "cooled" using the heating elements 41, 43, 45 and 47, as it exits, after the part 10, has been heated to the maximum specification requirements. This cooling is provided by insuring that the subsequent heating zones are at a lower temperature than the preceding heating zone, and that the part 10, sees a uniform thermal gradient as it goes from one zone to another riding on the belt 40.

The peripheral heating problem of large parts using a conventional heating furnace has also been solved by the inventive furnace 50. This is accomplished through the use of the sequential drive system and the revolutionary heater design. As one can see in FIG. 1, that each heating zone in the furnace 50, has multiple individually controlled heating elements. When the part 10, enters the heating or "cooling" zone more heat is directed to the center of the part 10, and less to the periphery. The element temperatures are adjusted to reduce the intra-part thermal gradients while the part 10, is being heated or "cooled". Each successive zone is adjusted to continue raising the part temperature or reducing the part temperature without thermal gradients.

Another problem solved by the inventive furnace 50, is the long dwell times that the conventional belt type furnaces were yielding. Dwell time as used herein is the time it takes for a part that is being heated to go from an original temperature to a higher temperature and then back down to the original temperature. All conventional belt furnaces use a slow, constantly moving belt for product transport. Using constant moving conventional belt furnace, the part spends a significant period partially in the heating zone and partially in the cooling zone. The front of the part is being cooled at the same time that the back of the part is being heated. This heating and cooling causes thermal conduction within the part and large thermal gradients are produced that induce thermal stress to the part. With the furnace of this invention the part is either uniformly heated or "cooled" during the thermal cycling process and the whole part sees the same temperature. Therefore, the transition of the part from the last heating zone to the "cooling" zone takes a very short time.

The problem of thermal stress due to the continuous movement of the part in a conventional furnace has also been greatly reduced by the inventive furnace 50, due to the use of a sequential drive belt 40. The belt 40, stops with the part 10, in the center of the heating or "cooling" zone. The heating or "cooling" is provided by one or more of the upper, lower or side heaters having two or more heating elements. After a prescribed period of time, the belt 40, accelerates, and then decelerates, and places the part 10, in the center of the next heating or "cooling" zone. Of course, the transit and soak times are programmable, using a computer or a controller. The program for the transit from one zone to another zone should be such that the part 10, never reaches a constant velocity. For example, for a 15 second programmed transit time, the part should be accelerated for the first 7.5 seconds, and then decelerated for the next 7.5 seconds. This presents the smoothest possible mechanical transfer of the part 10, from one zone to another.

The problem of non-uniform heating of a part has also been solved by this inventive furnace 50. In the past when uniform heat flux was applied, the part would heat faster around the periphery than in the center. This condition was observed not only for a conventional belt furnace, but also for a batch oven. As with the slow moving belt, this was another condition that contributed to intra-part thermal gradients that induce stress to the part. The furnace 50, with its sequential belt 40, provides a unique solution to the intra-part thermal gradients problem. Because the sequential belt 40, positions the part 10, in the center of each heating or "cooling" zone one knows where the part is. This allows the design of heating elements that direct more radiant flux to the center of the part than to the periphery. The heating or "cooling" zone typically contain concentric heating elements. The individual heating elements in each zone can be adjusted to provide the correct radiation across the part for uniform part heating while in that zone. Similarly, the individual heating elements can also be adjusted to provide a unique or different thermal profile.

The flux build-up in conventional furnaces has been a problem that has existed for years. In conventional furnaces, the gas flows from the hot section of the muffle to the cooler section. This is done to allow the hot gasses to heat the parts in the furnace more uniformly and efficiently. In the inventive furnace 50, the emphasis is to provide uniform heating or "cooling" of the part, by providing radiant or thermal energy and this cannot be done with hot gases. The controlled heating or "cooling" of the part can only be provided by the use of radiant energy as the significant contributor. Therefore, the process gas 15, is introduced at the part entrance of the furnace, and the gas 15, is allowed to exit after the last heating zone. Using the inventive furnace 50, the gas 15, and the evaporated flux always goes to the hotter section of the muffle, and never gets an opportunity to condense on a cold surface of the part. To keep these volatiles from condensing in the house exhaust system, an afterburner 53, can be added to the furnace to incinerate any residual volatiles.

As one can see that the furnace of this invention provides a substantially reduced temperature gradient during heating and "cooling" of a part, and allows dwell times half that of a conventional belt furnace. Additionally, the problem of flux condensation and contamination has been eliminated by the introduction of the gas at the beginning of the heating process, and then by the incineration of any residual volatiles. This new furnace removes the thermal mass limits that parts had run into with regard to many thermal processes, such as, chip joining and pin brazing.

This inventive furnace could be modified so that a plurality of heating zones remain at the same temperature to allow a part or product to experience a different temperature heating profile. Similarly, the heating zones could be modified to provide the desired temperature heating or "cooling" profile.

A conventional cooling system could also be attached at the end of the last heating zone 51, to further cool the part 10. Similarly, other processing equipments can be easily secured or attached to the end of the last heating zone 51, for the further processing of the part 10.

This inventive furnace can be used for a variety of processes, for example, pin brazing process, chip join process, to name a few.

Means for moving the sequential belt 40, could also be modified so that the belt 40, could move in a reversible or similar such manner. Similarly, the furnace 50, could have one or more sequential belts 40, and these sequential belts 40, could be on the same or different planes.

The furnace 50, has been illustrated with an upper heating zone 35, and a lower heating zone 25, but the furnace could work with just one of the heating zones. Similarly, the inventive furnace 50, could also have individual heaters on the side walls of the furnace or other appropriate locations.

EXAMPLE

The following example is intended to further illustrate the invention and is not intended to limit the scope of the invention in any manner.

The operation was as follows: A system similar to one shown in FIG. 1, was used where the sequential drive belt 40, transported a part 10, using a sequential drive motor, into the first heating zone. In that zone, the radiant flux was adjusted to raise the part temperature from ambient to 40° C. After a set period of time, the part was then transported to the second heating zone where the temperature was raised from 40° C. to 80° C. In each zone this process of raising the temperature of the part by a set amount continued, until the last heating zone was reached where the part temperature was raised from 320° C. to 360° C. Each of the heating zones of course had heaters that had a plurality of heating elements. Throughout this temperature raising process the intra-part gradients rarely exceed 10° C. After a pre-set time the part was moved to the first "cooling" zone, where the part temperature was slowly lowered, using the same inventive process that was used to heat the part, until the desired part temperature is reached. As discussed earlier other cooling methods can also be employed with this inventive furnace.

The belt moved the product in 15 seconds from the center of one zone to the center of the next. During this time the belt was accelerated for 7.5 seconds and then decelerated for the next 7.5 seconds. This allowed the part to be properly situated for the heating or "cooling" process. The belt then stopped for 90 seconds. The move, stop, heat and move process was sufficient to bring each of the parts or substrates in their own heating zone and then to uniformly heat the part by 40° C. Of course for a different application a different move, stop, heat, move process would be employed. The time the part was between the different zones has been greatly reduced and so is the high thermal gradients and stress. This has also allowed dwell times to improve to a point that 2 minutes and less of dwell times have been achieved.

Figure 3:
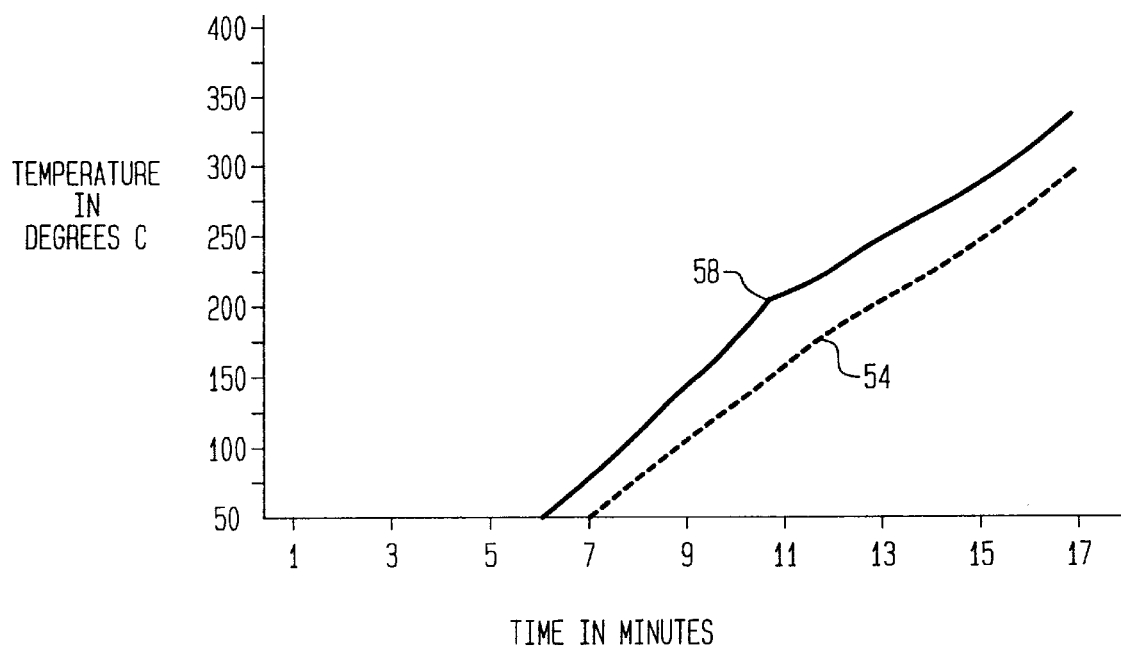
FIG. 3, is a graph showing a typical heating profile of a substrate using a prior art convention belt type furnace.
Figure 4:
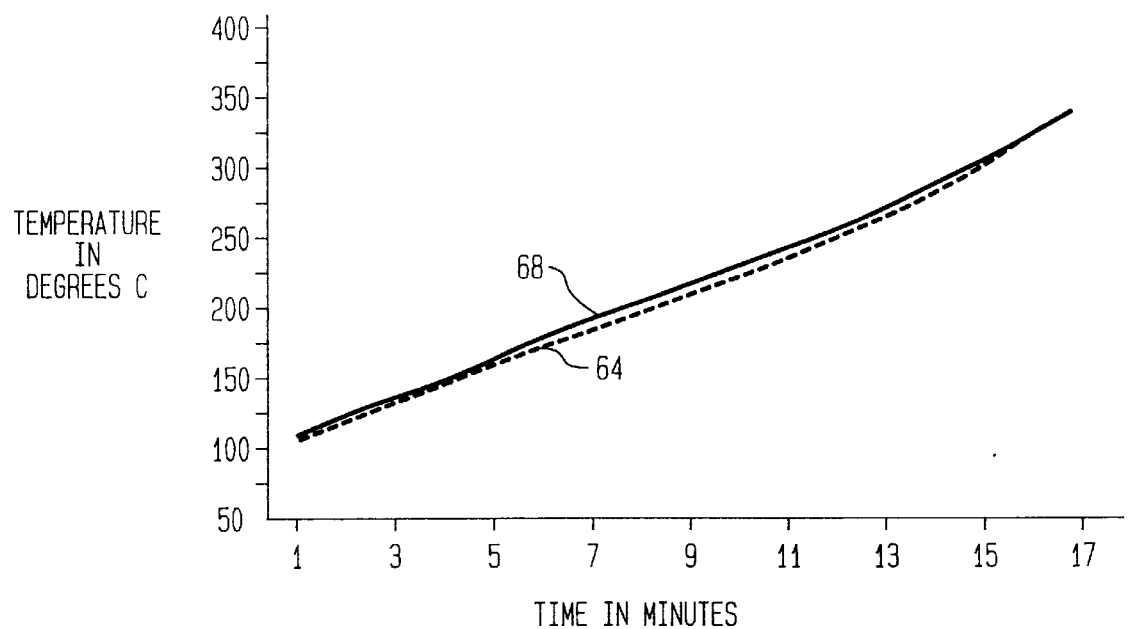
FIG. 4, is a graph showing a typical heating profile of a substrate using a belt type furnace made according to the teachings of this invention.

FIGS. 3 and 4, show the difference for a standard heating profile. FIG. 3, is a thermal profile that was obtained using a conventional belt furnace. The part was heated rapidly in the conventional belt furnace and then allowed to normalize. Line 54, plots the center temperature for the part, while the peripheral temperature was plotted by line 58. As one can see, that the maximum thermal gradient at any given time between the corners of the part and the center of the part was in most cases almost 50° C.

When a similar part was processed under similar process conditions using the inventive furnace the intra-part thermal gradient for the part at any given time was a maximum of 10° C., as can be seen in FIG. 4. The center temperature of the part during process is shown by line 64, while line 68, plots the temperature at the corners or peripheral edges. FIG. 4, clearly shows that the temperatures across the part were very uniform which of course produced much less thermal stress in the part. Similarly, the maximum temperatures across the part occurred almost simultaneously, which also produces lower thermal stress in the part.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A process for heating a structure comprising:
   a) at least one transporting means for moving and holding said structure in the vicinity of at least one heating zone,
   b) heating said structure in said heating zone, wherein said heating zone comprises at least one individual heating unit having at least two individual heating elements, and wherein the cross-sectional area of one of said at least two individual heating elements is larger than the cross-sectional area of the other of said at least two individual heating elements,
   c) said heating zone heats said structure in such a manner that said structure has a minimum of thermal gradient across all cross-sectional areas, and
   d) said at least one transporting means moves said structure to the next zone after the desired temperature has been reached.

2. The process of claim 1, wherein said at least two individual heating elements uniformly heat said structure.

3. The process of claim 1, wherein said at least two individual heating elements non-uniformly heat said structure.

4. The process of claims 1, wherein a computer controls the heating profile for said at least two individual heating elements.

5. The process of claim 1, wherein said at least two individual heating elements are concentric.

6. The process of claim 1, wherein said at least one transporting means for moving and holding said structure is at least one belt.

7. The process of claim 1, wherein at least one of said at least one heating zone is above said at least one transporting means.

8. The process of claim 1, wherein at least one of said at least one heating zone is below said at least one transporting means.

9. The process of claim 1, wherein said at least one transporting means for moving and holding moves in steps so that at least a portion of said at least one transporting means stops in the vicinity of said at least one heating zone.

10. The process of claim 1, wherein said at least one transporting means for moving and holding has at least one means for accelerating and decelerating said at least one transporting means for moving and holding.

11. The process of claim 10, wherein said structure is heated for a predetermined period of time and wherein said at least one transporting means is accelerated for a portion of said predetermined period of time and said at least one transporting means is decelerated for a portion of said predetermined period of time.

12. The process of claim 10, wherein said structure is heated for a predetermined period of time and wherein said at least one transporting means is accelerated for half of said predetermined period of time and said at least one transporting means is decelerated for half of said predetermined period of time.

13. The process of claim 1, wherein exhaust from said at least one individual heating unit is directed into at least one afterburner.

14. The process of claim 13, wherein said at least one afterburner has at least one igniting media.

15. The process of claim 14, wherein said igniting media is at least one flammable gas.

16. The process of claim 1, wherein said at least one individual heating unit provides uniform heating.

17. The process of claim 1, wherein said at least one individual heating unit provides non-uniform heating.

18. The process of claim 1, wherein said structure is transported into a cooling unit to cool said structure.

19. The process of claim 1, wherein a computer controls the movements of said at least one transporting means for moving and holding.

20. The process of claim 1, wherein at least one proportioning device proportionally distributes the power to said at least two heating elements.

21. The process of claim 1, wherein said structure is selected from a group consisting of chip and substrate.

* * * * *